(12) United States Patent
Donaldson

(10) Patent No.: US 7,832,741 B2
(45) Date of Patent: *Nov. 16, 2010

(54) VEHICLE SUPPORT SYSTEM

(75) Inventor: James A. Donaldson, Puyallup, WA (US)

(73) Assignee: Genie Industries, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/210,446

(22) Filed: Sep. 15, 2008

(65) Prior Publication Data

US 2009/0206567 A1 Aug. 20, 2009

Related U.S. Application Data

(60) Continuation of application No. 11/694,028, filed on Mar. 30, 2007, now Pat. No. 7,425,004, which is a division of application No. 10/808,742, filed on Mar. 24, 2004, now Pat. No. 7,198,278.

(51) Int. Cl.
*B60P 1/00* (2006.01)
(52) U.S. Cl. ...................... 280/6.156; 180/209; 414/685
(58) Field of Classification Search .............. 280/6.153, 280/6.155, 6.156, 43, 43.17, 86.5, 766.1, 280/765.1, 764.1; 180/209, 41, 242, 906; 414/685, 687, 680, 694; 212/302, 305
See application file for complete search history.

(56) References Cited

U.S. PATENT DOCUMENTS

| | | | |
|---|---|---|---|
| 3,397,898 A | 8/1968 | Denney et al. | |
| 3,475,008 A | 10/1969 | Taylor | |
| 3,820,497 A | 6/1974 | Konijin | |
| 3,899,037 A | 8/1975 | Yuker | |
| 4,039,094 A | 8/1977 | Grove | |

(Continued)

FOREIGN PATENT DOCUMENTS

BE 1 009 973 A4 11/1997

(Continued)

OTHER PUBLICATIONS

Terex, HS41MM Walking Excavator—www.terex.com—4 Pages.

(Continued)

*Primary Examiner*—Ruth Ilan
*Assistant Examiner*—Drew Brown
(74) *Attorney, Agent, or Firm*—Brooks Kushman P.C.

(57) ABSTRACT

The disclosure is generally directed toward vehicle support systems. In one embodiment of the invention, first and second support assemblies can be pivotally coupled to a base. A control mechanism can couple the first and second support assemblies together and be configured to control pivotal movement of the support assemblies between spread and stowed positions. In another embodiment, first and second support assemblies can be pivotally coupled to a base and to first and second wheel assemblies. First and second steering mechanisms can be coupled to the first and second wheel assemblies and the first and second support assemblies. A control system can be operatively coupled to the first and second steering mechanisms and can be configured to command selected angular positions of the first and second wheel assemblies relative to the base by compensating for the support assemblies being in various positions.

15 Claims, 7 Drawing Sheets

U.S. PATENT DOCUMENTS

| | | | |
|---|---|---|---|
| 4,241,803 A | 12/1980 | Lauber |
| 4,265,326 A | 5/1981 | Lauber |
| 4,266,627 A | 5/1981 | Lauber |
| 4,395,191 A | 7/1983 | Kaiser |
| 4,958,584 A | 9/1990 | Williamson |
| 5,137,101 A | 8/1992 | Schaeff |
| 6,224,102 B1 | 5/2001 | Nebel |
| 6,371,243 B1 | 4/2002 | Donaldson |
| 6,443,687 B1 | 9/2002 | Kaiser |
| 7,198,278 B2 | 4/2007 | Donaldson |
| 7,425,004 B2 | 9/2008 | Donaldson |

FOREIGN PATENT DOCUMENTS

| | | |
|---|---|---|
| DE | 4028773 A1 | 4/1991 |
| DE | 42 19 803 A1 | 12/1993 |
| EP | 1 580 100 A2 | 9/2005 |
| EP | 1 537 007 B1 | 4/2006 |
| FR | 2 844 245 A1 | 3/2004 |
| GB | 767420 | 2/1957 |
| GB | 1195476 A | 2/1970 |
| WO | 9950128 A1 | 10/1999 |
| WO | 0214086 A1 | 2/2002 |
| WO | 2004/024541 A1 | 3/2004 |

OTHER PUBLICATIONS

Terex, HS41 Walking Excavator -www.terex.com—4 Pages.
Terex, HS41M Walking Excavator—www.terex.com—4 Pages.
European Search Report Dated Dec. 21, 2005—Application No. 05006306.4-2425 Applicant Genie Industries, Inc.
European Search Report Dated Aug. 17, 2009, Application No. 09005245.6-1228 Applicant—Genie Industries, Inc.
European Patent Office Communication Dated Apr. 26, 2010, Application Genie Industries, Inc., Application No. 09 005 246.5-1268.

VEHICLE SUPPORT SYSTEM

CROSS REFERENCE TO RELATED APPLICATION

This application is a continuation of U.S. patent application Ser. No. 11/694,028 (now U.S. Pat. No. 7,425,004) filed Mar. 30, 2007, titled "VEHICLE SUPPORT SYSTEM," which is a divisional of U.S. patent application Ser. No. 10/808,742 (now U.S. Pat. No. 7,198,278) filed Mar. 24, 2004, titled "VEHICLE SUPPORT SYSTEM."

TECHNICAL FIELD

The following disclosure relates generally to vehicle support systems, for example, vehicles that have movable support assemblies having spread and stowed positions.

BACKGROUND

Adjustable support systems for vehicles have been developed to increase the effective width of the vehicle during various types of operations. As an example, adjustable support systems have been used to add stability while operating a lift with a basket or while operating other tools (e.g., tools found on excavators). Increased stability is often provided by vehicle support systems having wheels on telescoping axles that can be extended to increase the vehicle's wheel track. Other support systems include deployable stabilizer arms, independent from the wheels, that can be lowered in a vertical plane to effectively increase the width of the vehicle's track.

One conventional vehicle support system has a pair of support arms pivotally mounted to a chassis. One actuator is connected to one of the support arms and to the chassis, and another actuator is connected to the other support arm and to the chassis. Each actuator pivotally moves its respective support arm relative to the chassis. Accordingly, the first and second support arms are pivoted by separate actuators. The costs for manufacturing and maintaining this type of system can be expensive and labor-intensive.

SUMMARY

The present invention is generally directed toward vehicle support systems, and in particular, vehicles that have elongated support assemblies having spread and stowed positions. One aspect of the invention is directed toward a vehicle support system including a base, and first and second elongated support assemblies pivotally coupled to the base. The first and second support assemblies are movable relative to the base and relative to each other between spread and stowed positions. The first and second support assemblies support at least a portion of the base above a support surface. A control mechanism mechanically interconnects the first and second support assemblies, and is configured to control pivotal movement of each of the first and the second support assemblies between the spread and stowed positions.

Another aspect of the invention is directed toward a vehicle support system including a base, and first and second elongated support assemblies pivotally coupled to the base. The first and second support assemblies are movable relative to the base and relative to each other between spread and stowed positions. The first and second support assemblies support at least a portion of the base above a support surface. A first wheel assembly is coupled to the first support assembly and a second wheel assembly is coupled to the second support assembly. A first steering mechanism is coupled to the first wheel assembly and the first support assembly, and a second steering mechanism is coupled to the second wheel assembly and the second support assembly. The first and second steering mechanisms can independently angularly position the corresponding first and second wheel assemblies relative to the first and second support assemblies.

A control system is operatively coupled to the first and second steering mechanisms and is configured to command selected angular positions of the first and second wheel assemblies relative to the base by compensating for the first and second support assemblies being in the spread or stowed positions. At least one of the angular positions being such that the first or second wheel assembly will create a force tending to urge the first and second support assemblies to move relative to one another as the vehicle translates.

Still another aspect of the invention is directed toward a vehicle support system including a base, and first and second elongated support assemblies pivotally coupled to the base. The first and second support assemblies are movable relative to the base and relative to each other between spread and stowed positions. The first and second support assemblies support at least a portion of the base above a support surface. A control mechanism mechanically interconnects the first and second support assemblies, and is configured to control pivotal movement of each of the first and the second support assemblies between the spread and stowed positions. A first wheel assembly is coupled to the first support assembly and a second wheel assembly is coupled to the second support assembly. A first steering mechanism is coupled to the first wheel assembly and the first support assembly, and a second steering mechanism is coupled to the second wheel assembly and the second support assembly. The first and second steering mechanisms can independently angularly position the corresponding first and second wheel assemblies relative to the first and second support assemblies. A control system is operatively coupled to the first and second steering mechanisms and is configured to command selected angular positions of the first and second wheel assemblies relative to the base by compensating for the first and second support assemblies being in the spread or stowed positions.

DETAILED DESCRIPTION

The present disclosure describes vehicle support systems. Several specific embodiments are set forth in the following description and in FIGS. 1-8 to provide a thorough understanding of certain embodiments of the invention. One skilled in the art, however, will understand that the present invention may have additional embodiments, and that other embodiments of the invention may be practiced without several of the specific features explained in the following description.

Figure 1:
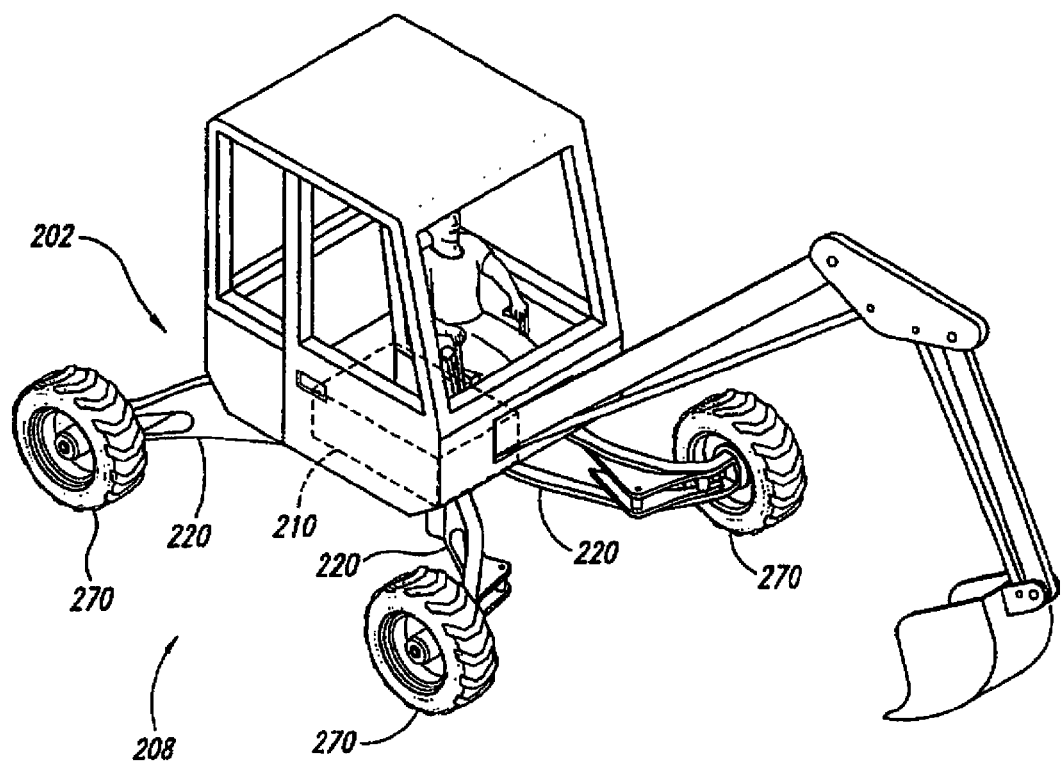
FIG. 1 is an isometric view of a vehicle with a vehicle support system having spreadable support assemblies in accordance with an embodiment of the invention.
Figure 2:
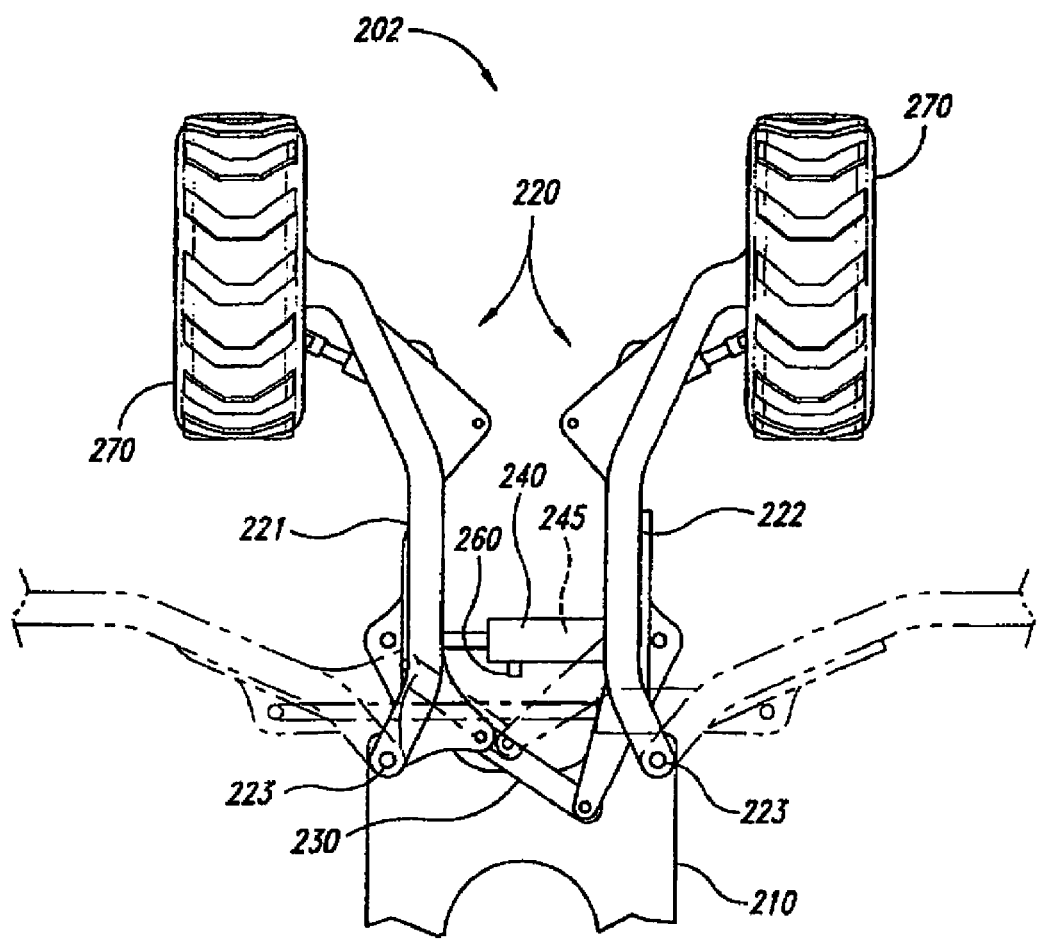
FIG. 2 is an enlarged partially schematic top plan view of a portion of the vehicle support system with spreadable support assemblies of FIG. 1.

FIG. 1 is an isometric view of a vehicle with a vehicle support system 202 in accordance with one embodiment of the invention. FIG. 2 is a partially schematic top plan view of a portion of the vehicle support system 202 of FIG. 1. In FIG. 1, the vehicle support system 202 has four elongated support assemblies 220 coupled to a base 210, one of which is hidden from view. Other embodiments can have more or fewer support assemblies 220. Each support assembly 220 has a wheel assembly 270 that engages the ground or other support surface 208. Accordingly, the support assemblies 220 support the base 210 above the support surface 208. The support assemblies 220 are pivotally coupled to the base 210 and movable relative to the base and relative to each other between a spread position (shown in FIG. 1) and a stowed position (shown in FIG. 2). When the support assemblies 220 are in the stowed position, the vehicle's wheel track (side-to-side) is smaller than the vehicle's wheel track when the support assemblies are in the spread position.

In one embodiment, the support assemblies 220 and wheel assemblies 270 are sized so, when the support assemblies are in the stowed position, the wheel assemblies 270 on the right side of the vehicle are spaced apart from the wheel assemblies 270 on the left side to fit within a normal traffic lane on a road or to fit on a trailer. Accordingly, the vehicle can be driven on a normal road for easy transit when the support assemblies 220 are in the stowed position. When the support assemblies 220 are pivoted to the spread position, the vehicle's wheel track is significantly increased. Accordingly, the support assemblies 220 in the spread position provide increased stability of the vehicle for example, as required during operation of an excavator or lift basket (although transit is still possible with the support assemblies 220 in the spread position).

In FIG. 2, two support assemblies 220 are shown as a first support assembly 221 and a second support assembly 222. The first and second support assemblies are pivotally coupled to the base 210 by support couplers 223. Other embodiments can have more than two support assemblies 220, and/or two or more support assemblies 220 can be coupled to the base 210 with a single support coupler 223.

The first and second support assemblies 221 and 222 are coupled together by a control mechanism 240 that controls the pivotal movement of the first and second support assemblies 221 and 222 between the spread and stowed positions. In one embodiment, the control mechanism 240 is configured to control at least one of a rate of movement, a range of movement, and a direction of movement of the first and second support assemblies 221 and 222. The control mechanism 240 of the illustrated embodiment includes a hydraulic actuator 245 pivotally connected to each of the first and second support assemblies 221 and 222. The control mechanism pushes or pulls on the first and second support assemblies 221 and 222 to move them relative to each other between the spread and stowed position. The control mechanism 240 of other embodiments can include one or more actuators electrically operated, pneumatically operated, or even manually operated. In still other embodiments the control mechanism controls the movement of the first and second support assemblies 221 and 222, but does not include an actuator. In FIG. 2 the support assemblies 220 are shown in a stowed position. Phantom lines depict the support assemblies 220 in a spread position. Although the first and second support assemblies 221 and 222 are shown in FIG. 2 as a forward or aft support assembly pair, in other embodiments the first and second support assemblies 221 and 222 can include any two support assemblies of the vehicle support system 202.

In FIG. 2, a mechanical link 230 interconnects the first and second support assemblies 221 and 222. The mechanical link 230 can be configured to coordinate synchronized movements of the first and second support assemblies 221 and 222, so that the first and second support assemblies move simultaneously between the stowed and spread positions. The mechanical link 230 in the illustrated embodiment facilitates the coordinated and substantially symmetrical movement of the first and second support assemblies 221 and 222 between the stowed and spread positions.

In FIG. 2 the first and second support assemblies 221 and 222 engage the support surface 208 via the wheel assemblies 270. Accordingly, it is not necessary to elevate the first and second support assemblies 221 and 222 prior to moving them between the spread and stowed positions. The first and second support assemblies can be moved between the spread and stowed positions while the vehicle support system 202 is in motion. Although only two wheel assemblies 270 are shown in FIG. 2, other embodiments can have more or fewer wheel assemblies 270. In an alternate embodiment, the first and second support assemblies 221 and 222 can be elevated prior to being moved between the spread and stowed positions, for example, when the support assemblies directly engage the support surface 208 or engage the support surface via pads instead of wheel assemblies. In another embodiment, the control mechanism 240 can be configured to move the first and second support assemblies 221 and 222 of a stationary vehicle without elevating the first and second support assemblies 221 and 222. For example, the control mechanism 240 can be sized to simply slide the wheel assemblies 270, pads, or support assembly engagement points across the support surface 208 when moving the first and second support assemblies 221 and 222 between the spread and stowed positions.

One advantage of the vehicle support system 202 of the foregoing embodiments is that the number of actuators can be reduced over the number used in the prior art, as depicted in FIG. 1. For example, a single actuator can simultaneously move two support assemblies between the stowed and spread positions. By reducing the number of actuators used to move the support assemblies, the costs of manufacturing and maintenance of the vehicle support system can be reduced. Additionally, by reducing the number of actuators and/or total moving parts, less cleaning is required prior to moving the support assemblies during operations in environments where these actuators and parts can become packed with foreign material, further reducing the cost of operations. Furthermore, by reducing the number of required actuators, there are an increased number of protected areas available for placement of the control mechanisms and/or other moving parts where they are less likely to be damaged during operation.

In certain embodiments, one or more locking devices can be used to releasably maintain the support assemblies 221 and 222 in one or more selected positions. In FIG. 2, the control mechanism 240 includes a locking device 260. The locking device 260 has a locked state that prevents the first and second support assemblies 221 and 222 from substantially moving relative to each other between the spread and stowed positions. The locking device 260 allows vehicle operation while the support assemblies 221 and 222 remain in a fixed configuration. For example, the locking device 260 can lock the first and second support assemblies 221 and 222 in the stowed position, so the vehicle can be driven on a road. The locking device 260 also has an unlocked state that allows the first and second support assemblies 221 and 222 to be moved between the spread and stowed positions in order to accomplish changes in configuration. The locking device 260 can be an automated device or a manually-operated device. In another embodiment, the locking device can be connected to the first and second support assemblies 221 and 222 adjacent to the control mechanism 240 or spaced apart from the control mechanism.

Figure 3A:
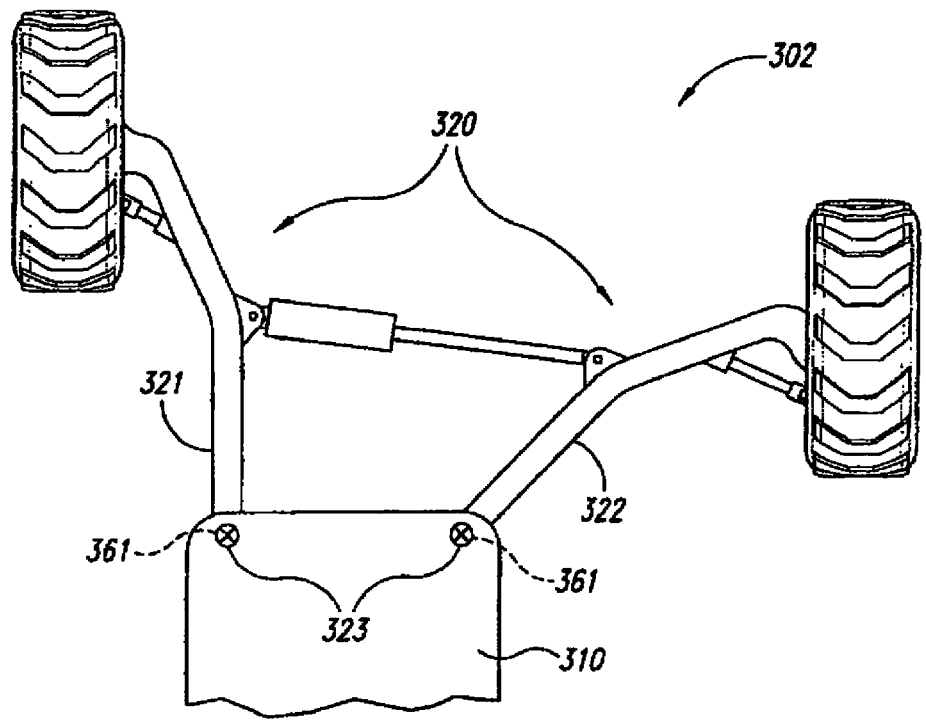
FIG. 3A is a partially schematic top plan view of a portion of a vehicle support system with spreadable support assemblies in accordance with another embodiment of the invention.

FIG. 3A is a partially schematic top plan view of a portion of a vehicle support system 302 with spreadable elongated support assemblies 320 pivotally coupled to a base 310 by support couplers 323, in accordance with another embodiment of the invention. The support system 302 of this embodiment has four support assemblies 320 connected to the base 310, although only a first support assembly 321 and a second support assembly 322 are shown. The first and second support assemblies 321 and 322 move relative to the base 310 and relative to each other between spread and stowed positions. Locking devices 361 are pivotal locking devices built into the support couplers 323 that pivotally couple the first and second support assemblies 321 and 322 to the base 310. The locking devices 361 have locked states that releasably lock the first and second support assemblies 321 and 322 in selected positions and unlocked states that allow movement of the first and second support assembly 321 and 322 away from the selected positions.

Figure 3B:
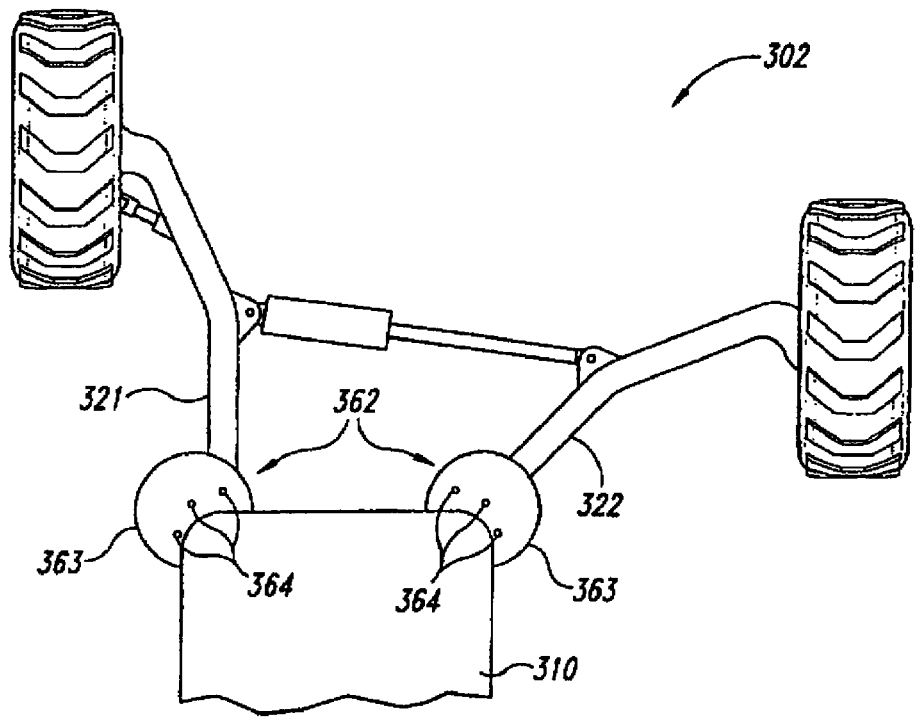
FIG. 3B is a partially schematic top plan view of a portion of a vehicle support system with spreadable support assemblies and locking devices in accordance with yet another embodiment of the invention.

FIG. 3B is a partially schematic top plan view of a portion of a vehicle support system 302 similar to the vehicle support system shown in FIG. 3A, but having different locking devices 362, in accordance with a further embodiment of the invention. The locking devices 362 include collars 363 located proximate to the first and second support assemblies 321 and 322. Locking pins 364 are used to couple the first and second support assemblies 321 and 322 to the collars 363, locking the first and second support assemblies 321 and 322 into selected positions (locked state). When the locking pins 364 are removed, the first and second support assemblies 321 and 322 are allowed to move away from the selected positions (unlocked state).

In certain aspects of the above embodiments, the locking devices can lock the first and second support assemblies 321 and 322 in any one of a plurality of selected positions relative to the base 310. In other embodiments, a single locking device, having both a locked and unlocked state, can be used to lock both of the first and second support assemblies 321 and 322 in selected position(s) (e.g., as discussed above with reference to FIG. 2 and below with reference to FIG. 5A).

Figure 4:
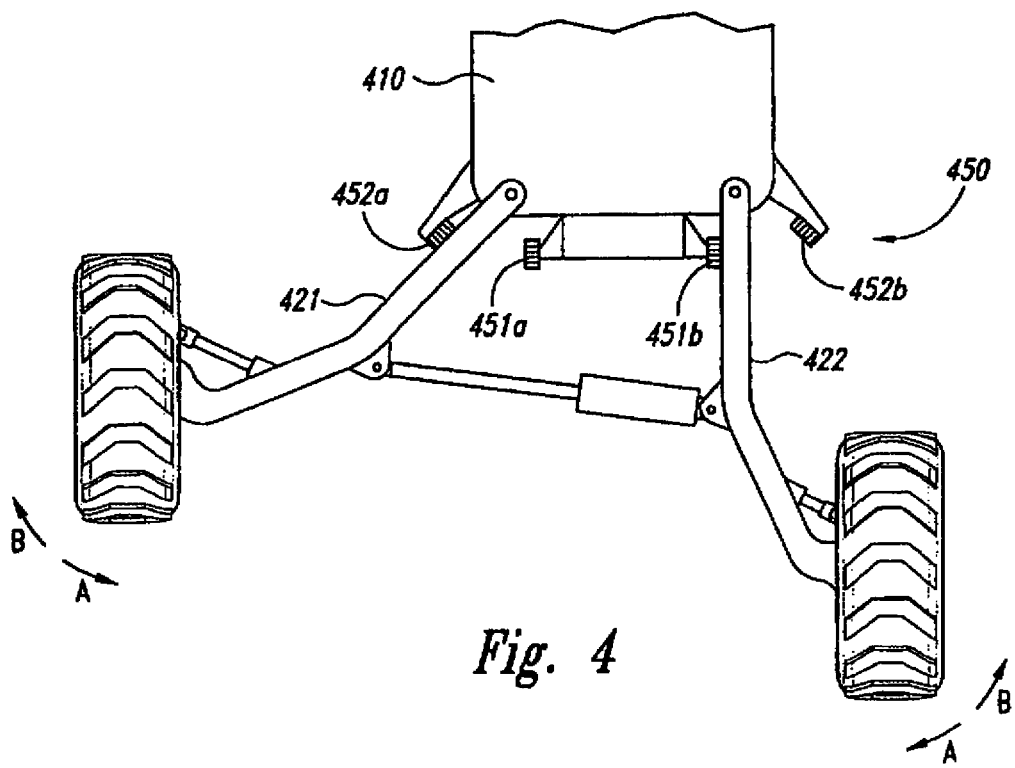
FIG. 4 is a partially schematic top plan view of a portion of a vehicle support system with spreadable support assemblies and stops in accordance with a further embodiment of the invention.

In another embodiment, shown in FIG. 4, stops 450 are located proximate to first and second support assemblies 421 and 422. Each stop 450 is configured to prevent at least one of the first and second support assemblies 421 and 422 from moving past its spread or stowed position. For example, in FIG. 4 inner stops 451a and 451b are connected to the base 410 between the first and second support assemblies 421 and 422 and positioned to prevent the first and second support assemblies from moving toward each other (as shown by Arrows A) past the stowed position. Similarly, outer stops 452a and 452b are connected to the base 410 and positioned to prevent the first and second support assemblies 421 and 422 from moving away from each other (as shown by Arrows B) beyond the spread position. In at least one embodiment, the inner and outer stops 451a, 451b, 452a, and 452b can be adjustable, thereby adjusting spread and stowed positions of the first and second support assemblies 421 and 422 relative to the base 410.

Figure 5A:
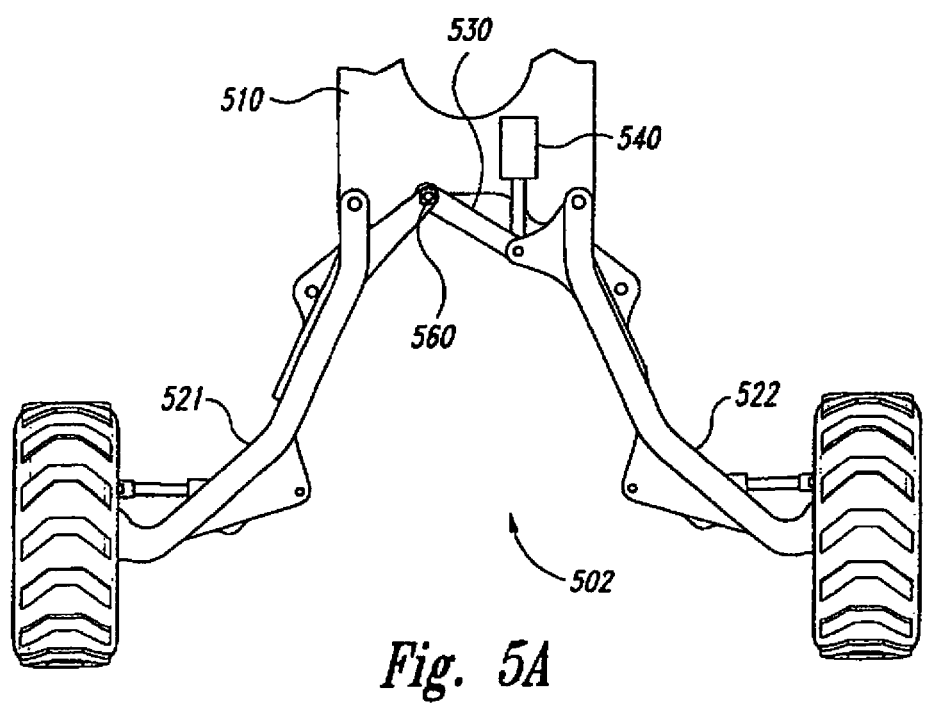
FIG. 5A is a partially schematic top plan view of a portion of a vehicle support system with spreadable support assemblies and a mechanical link in accordance with certain embodiments of the invention.

FIG. 5A is a partially schematic top plan view of a portion of a vehicle support system 502 illustrating certain embodiments of the invention where locking devices, stops, and/or control mechanisms can operate via a mechanical link. FIG. 5A shows a vehicle support system 502 with spreadable support assemblies 521 and 522 pivotally coupled to a base 510 and interconnected by a mechanical link 530. The first and second support assemblies 521 and 522 can move relative to the base 510 and relative to each other between spread and stowed positions. The mechanical link 530 coordinates the movement of the first and second support assemblies 521 and 522 so that they move together in a coordinated fashion between the stowed and spread positions.

Because the mechanical link 530 coordinates the movement of the first and second support assemblies 521 and 522, a locking device 560 coupled to the mechanical link 530 can be used to lock the mechanical link into selected positions, thereby locking the first and second support assemblies 521 and 522 into selected positions. When the mechanical link 530 is unlocked and allowed to move, the first and second support assemblies 521 and 522 are also allowed to move. As discussed in the foregoing embodiments, the locking device 560 can include various locking devices, including a pivotal locking device (as shown in FIG. 5A) or a collar and pin arrangement configured to operate on the mechanical link.

In another embodiment, one or more stops can be positioned to limit the range of motion of the mechanical link 530. When the mechanical link 530 engages a stop and is prevented from further movement, the first and second support assemblies 521 and 522 are also prevented from moving beyond corresponding positions. For example, one or more pivotal stops could replace the locking device 560 shown in FIG. 5A, preventing movement of the mechanical link 530 beyond one or more selected positions corresponding to the first and second support assemblies 521 and 522 being in a spread and/or stowed position.

In still another embodiment, a control mechanism 540 can interconnect the first and second support assemblies 521 and 522 via the mechanical link 530. As the control mechanism 540 controls movement of the mechanical link 530, movement of the first and second support assemblies 521 and 522 is also controlled. For example, if the control mechanism 540 includes an actuator that moves the mechanical link 530 to a selected position, the first and second support assemblies 521 and 522 will move in a coordinated fashion to corresponding selected positions.

Figure 5B:
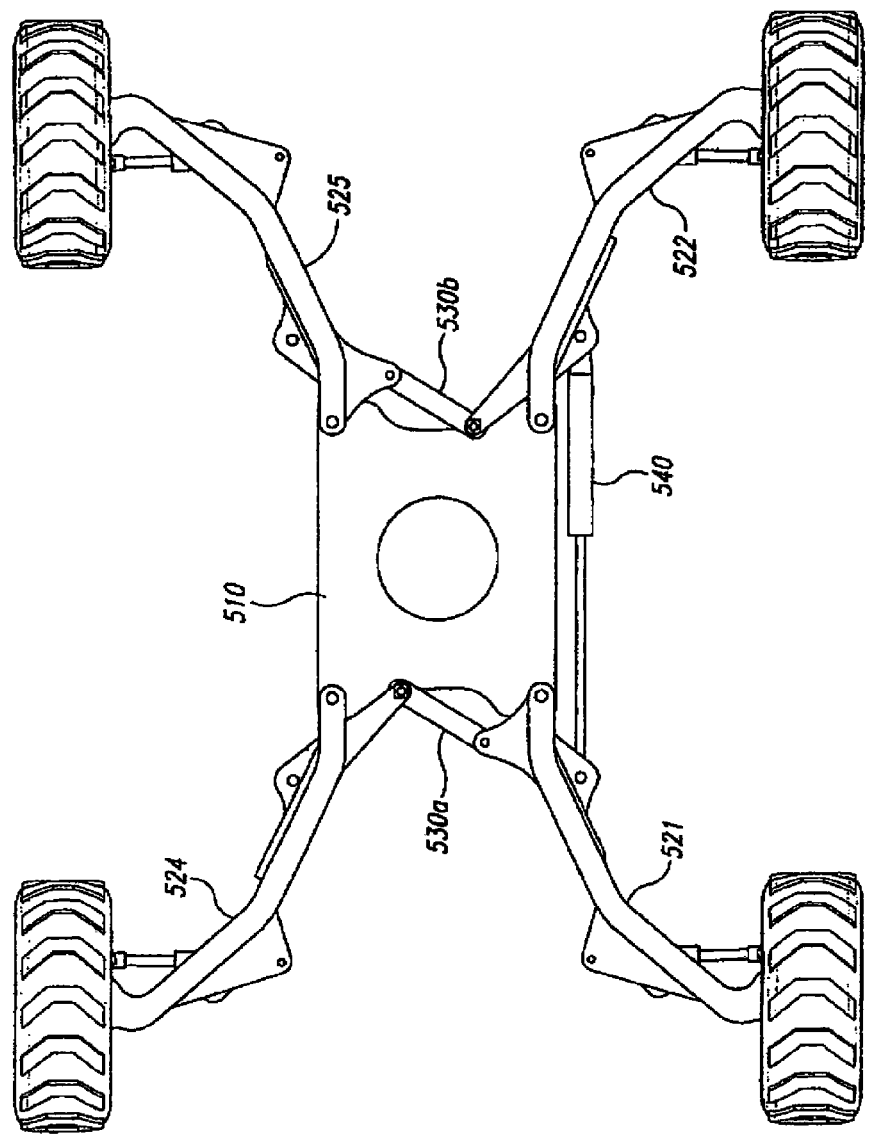
FIG. 5B is a partially schematic top plan view of a vehicle support system with spreadable support assemblies and two mechanical links in accordance with another embodiment of the invention.

In other embodiments, the mechanical link can be used to coordinate the movement of other support assemblies. For example, as shown in FIG. 5B, a first mechanical link 530a can interconnect a first support assembly 521 with a third support assembly 524, coordinating the synchronized movement of the first and third support assemblies 521 and 524. A second mechanical link 530b can interconnect a second support assembly 522 with a fourth support assembly 525, coordinating the synchronized movement of the second and fourth support assemblies 522 and 525. Accordingly, a single control mechanism 540 interconnecting the first and second support assemblies 521 and 522, directly (as shown in FIG. 5B) or through the first and second mechanical links 530a and 530b, can control the pivotal movement of all four support assemblies 521, 522, 524, and 525. Other embodiments can include other arrangements, for example, a first mechanical link can interconnect a second support assembly and a third support assembly, and a second mechanical link can interconnect the third support assembly and a fourth support assembly. Accordingly, a single control mechanism interconnecting the first and second support assemblies can control the pivotal movement of all four support assemblies. Still other embodiments can include at least one mechanical link that coordinates the movement of more than two support assemblies.

One advantage of foregoing embodiments is that the use of locking devices and stops can enhance the operation of and/or reduce the design requirements of the control mechanism. For example, when a control mechanism includes an actuator and locking devices are used to lock the support assemblies in place, the size of the actuator can be reduced, further reducing manufacturing and maintenance costs.

Figure 6:
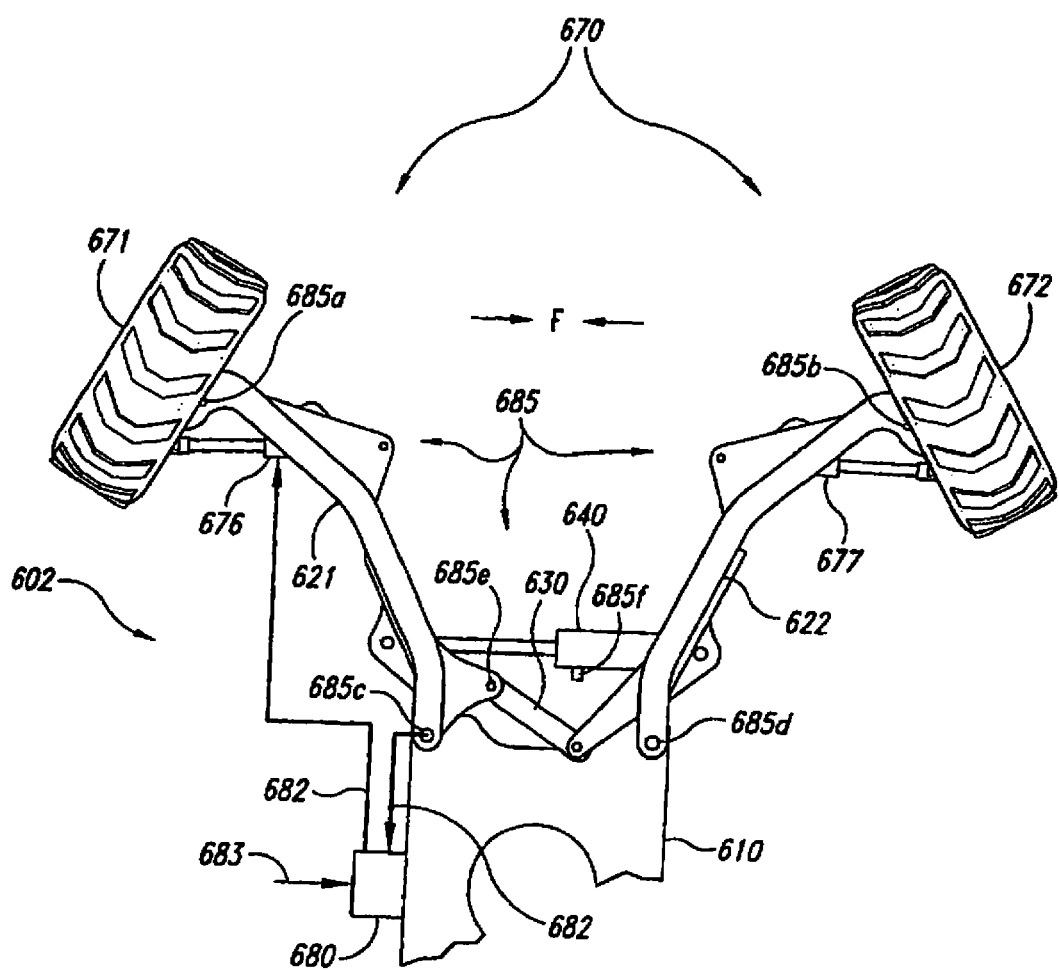
FIG. 6 is a partially schematic top plan view of a portion of a vehicle support system with spreadable support assemblies and a control system in accordance with other embodiments of the invention.

FIG. 6 is a partially schematic top plan view of a portion of a vehicle support system 602 with spreadable support assemblies 621 and 622 pivotally coupled to a base 610 and a control system 680 in accordance with other embodiments of the invention. The vehicle support system 602 includes a plurality of wheel assemblies 670, of which only a first wheel assembly 671 and a second wheel assembly 672 are shown. The first wheel assembly 671 is coupled to the first support assembly 621 and the second wheel assembly 672 is coupled to the second support assembly 622. A first steering mechanism 676 is coupled to the first wheel assembly 671 and to the first support assembly 621. A second steering mechanism 677 is coupled to the second wheel assembly 672 and to the second support assembly 622. The first and second steering mechanisms 676 and 677 can be configured to independently position the corresponding first and second wheel assemblies 671 and 672 relative to the first and second support assemblies 621 and 622.

In the illustrated embodiment, the control system 680 is coupled to the first and second steering mechanism 676 and 677 and is configured to command selected angular positions of the first and second wheel assemblies 671 and 672 relative to the base 610 to steer and maneuver the vehicle. The control system 680 can also be configured to control the first and second steering mechanisms 676 and 677 so as to compensate as needed depending upon whether the first and second support assemblies 621 and 622 are in the spread position, the stowed position, or an intermediate position. Accordingly, the vehicle can be steered or maneuvered regardless of the position of the first and second support assemblies 621 and 622.

The control system 680 can also be configured to independently position the first and second support assemblies 621 and 622 to compensate for the different turn radius of an inside and outside wheel during a turn. For example, to avoid wheel scrub during a turn, the wheel assembly 670 on the inside of a turn can be positioned at a sharper angle relative to the base 610 than the wheel assembly 670 on the outside of the turn. The angular difference between the inside and outside wheel assemblies 670 can be increased or decreased based on the position of the first and second support assemblies 621 and 622 and the corresponding distance between the wheel assemblies 670. The control system 680 can also be configured to provide true crab steering and other features described in U.S. Pat. No. 6,371,243, which is fully incorporated herein in its entirety by reference.

The control system 680 can be electrically operated (e.g., the control system 680 can include a microprocessor) or mechanically operated. The control system 680 is coupled to the first and second steering mechanisms 676 and 677 by signal paths 682. The signal paths 682 can be configured to carry any type of signal, including electrical, optical, mechanical, or hydraulic. In FIG. 6, only one electrical signal path 682 coupling the control system 680 and the first steering mechanism 676 is shown for purposes of illustration. The control system 680 can be coupled to other steering mechanisms in a similar manner when the vehicle is so equipped.

In one embodiment, sensors 685 can be coupled to the first and second support members 621 and 622 and configured to determine an angular position of the first and second wheel assemblies 671 and 672 relative to the base 610. In FIG. 6, six sensors 685 are shown as two wheel sensors 685a and 685b, two support sensors 685c and 685d, a link sensor 685e, and a control sensor 685f. Other embodiments can have more or fewer sensors 685. The sensors 685 can include various different types of sensors including optical, electrical, and mechanical sensors. Although each sensor 685 can be operatively coupled to the control system 680 by signal paths 682, for purposes of illustration, only one signal path 682 is shown coupling the control system 680 with the second sensor 685c. The signal paths 682 can be configured to carry any type of signal, including electrical, optical, mechanical, or hydraulic.

In FIG. 6, the wheel sensors 685a and 685b are configured to determine an angular position of the first and second wheel assemblies 671 and 672 relative to the corresponding first and second support assemblies 621 and 622. The support sensors 685c and 685d are configured to determine a position of the first and second support assemblies 621 and 622 relative to the base 610. The control system 680 uses these positions to determine the position of the wheel assemblies 671 and 672 relative to the base 610. Accordingly, the control system 680 can send signals to the first and second steering mechanisms 676 and 677 to command appropriate angular positions of the first and second wheel assemblies 671 and 672 relative to the base 610 in response to operator input 683.

In other embodiments, the wheel sensors 685a and 685b determine an angular position of the first and second wheel assemblies 671 and 672 relative to the corresponding first and second support assemblies 621 and 622, but different support sensors can be used to determine the position of the first and second support assemblies 621 and 622 relative to the base 610. For example, the link sensor 685e can be configured to detect a position of the mechanical link 630, which corresponds to positions of the first and second support assemblies 621 and 622 relative to the base 610. Alternately, either support sensors 685c or 685d can be used to detect the position of its respective support assembly 621 or 622 relative to the base 610. Because this position corresponds to a position of the mechanical link 630, which in turn corresponds to a position of the other support assembly 621 or 622, the position of both support assemblies 621 and 622 relative to the base 610 can be determined. In another embodiment, the control sensor 685f can be configured to detect a position of a control mechanism 640, which corresponds to positions of the first and second support assemblies 621 and 622 relative to the base 610. In further embodiments, the angular positions of the first and second wheel assemblies 671 and 672 relative to the corresponding first and second support assemblies 621 and 622 can be determined by different wheel sensors that detect the position of the first and second steering mechanisms 676 and 677.

The control system 680 can also be used to position the wheel assemblies 670 as the vehicle is moving forward or in reverse to create a force (shown by Arrows F in FIG. 6) that urges the first and second support assemblies 621 and 622 to pivot and move relative to one another as the vehicle support system 602 translates. For example, the control system 680 can command angular positions of the first and second wheel assemblies 671 and 672 such that the first and second wheel assemblies 671 and 672 tend to converge or diverge as the vehicle support system 602 translates and the first and second wheel assemblies 671 and 672 roll on a support surface. The force created by the first and second wheel assemblies 671 and 672 can be used to move the first and second support assemblies 621 and 622 toward the stowed or spread positions. This force created by the first and second wheel assemblies 621 and 622 can also be summed with forces created by other features, for example, a control mechanism 640 to move the first and second support assemblies 621 and 622 between the stowed and spread positions. Translation of the vehicle support system 602 can be due to internal or external forces. In one embodiment, the vehicle support system 602 can be installed in a vehicle and can translate because the vehicle is towed. In another embodiment, the vehicle support system 602 can be self-propelled.

One feature of foregoing embodiments is that movement of the support assemblies can be accomplished without an actuator by using a control system, steering mechanisms, and wheel assemblies, thereby reducing the manufacturing and maintenance costs. Even if a control mechanism that includes an actuator is used to move the support assemblies, the control system, steering mechanisms, and wheel assemblies can be used to create a force that urges the support assemblies toward the spread and stowed positions, reducing the actuation force that the actuator is required to generate. This can reduce wear and tear on the associated structure and actuator, and can reduce the actuation design requirements, thereby reducing manufacturing and maintenance costs.

Figure 7:
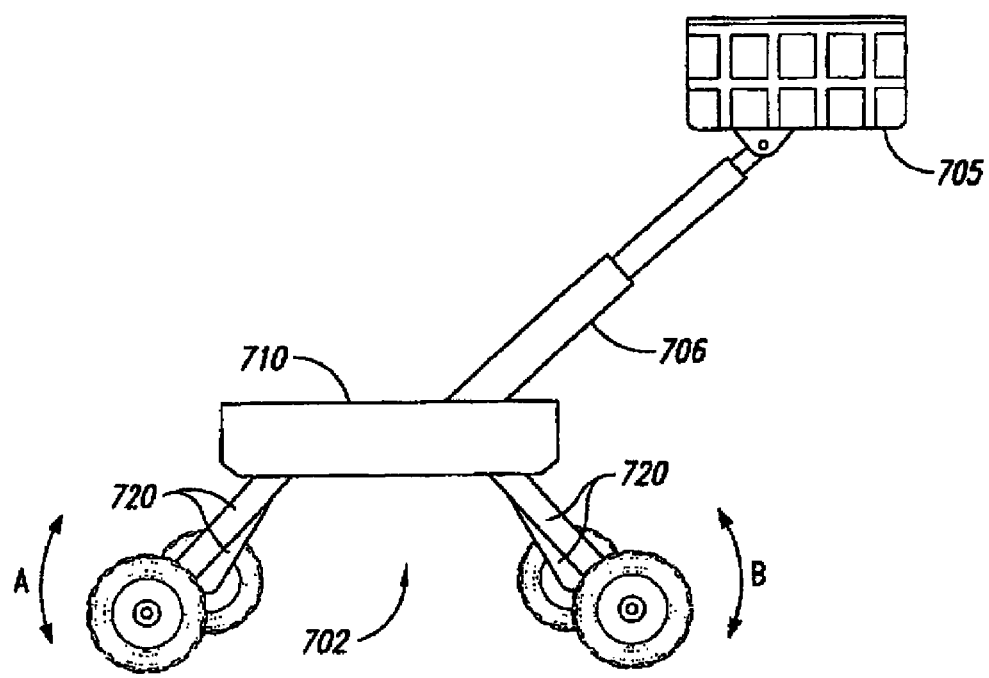
FIG. 7 is a partially schematic side elevation view of a vehicle with a vehicle support system and a basket in accordance with at least one embodiment of the invention.

Additionally, any of the foregoing embodiments can include a tool or a basket coupled to the base of the vehicle. For example, FIG. 7 is a partially schematic side elevation view of a vehicle support system 702 with a basket 705 coupled to the base 710 in accordance with an embodiment of the invention. The basket 705 can be coupled to the base 710 by an extendable support 706 that allows an operator to raise and lower the basket 705. At least one of the support assemblies 720 can be vertically movable, as shown by Arrows A and B. In FIG. 7, all four of the support assemblies 720 are vertically movable. In other embodiments, the vehicle can have more or fewer vertically movable support assemblies.

Figure 8:
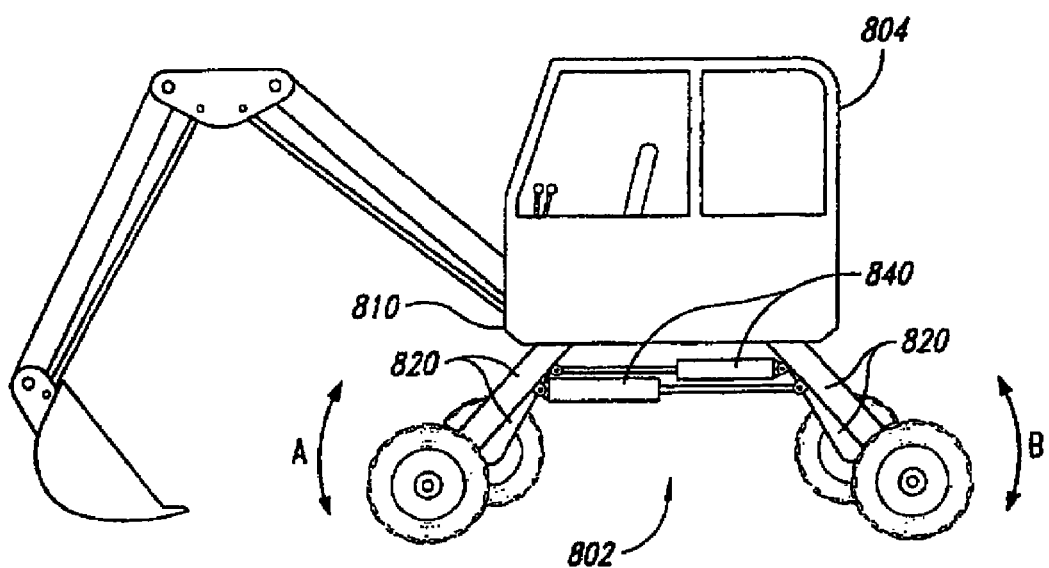
FIG. 8 is a partially schematic side elevation view of a vehicle with a vehicle support system and a tool in accordance with still another embodiment of the invention.

Furthermore, any of the foregoing embodiments can be used to create vertical movement of a portion of the vehicle. For example, FIG. 8 is a partially schematic side elevation view of a vehicle support system 802 with a tool 804 in accordance with another embodiment of the invention. In FIG. 8, the vehicle support system 802 includes a base 810 that is an integral part of the tool 804. The tool 804 can be configured for use by an operator and can include space where the operator can ride. In FIG. 8, all four of the support assemblies 820 are vertically movable (as shown by Arrows A and B) and the vertical motion of the support assemblies 820 is controlled by two control mechanisms 840. In FIG. 8, the spread and stowed positions have the effect of raising and lowering the base 810 and tool 804.

From the foregoing, it will be appreciated that specific embodiments of the invention have been described herein for purposes of illustration, but that various modifications may be made without deviating from the spirit and scope of the invention. For example, in one embodiment, a control system, steering mechanisms, and wheel assemblies can be used to urge movement of the support assemblies without the aid of a mechanical link or a control mechanism. In other embodiments, a control system, steering mechanisms, and wheel assemblies can be used to urge movement of the support assemblies (without the aid of a control mechanism) and locking devices can be used to lock at least one support assembly into a selected position. Accordingly, the invention is not limited except as by the appended claims.

I claim:

1. A vehicle comprising:
   a base;
   first and second elongated support assemblies movably coupled to the base and movable relative to the base and relative to each other between spread and stowed positions, the first and second support assemblies each being configured to engage a portion of a support surface such that the first and second support assemblies support at least a portion of the base above the support surface;
   a control mechanism mechanically interconnected with the first and second support assemblies, the control mechanism being configured to control movement of each of the first and the second support assemblies between the spread and stowed positions;
   a third elongated support assembly movably coupled to the base, the third support assembly being configured to engage a portion of the support surface such that the third support assembly supports at least a portion of the base above the support surface; and
   a first mechanical link interconnecting the first and third support assemblies and being configured to coordinate movement of the first and third support assemblies;
   wherein the control mechanism is configured to control movement of the third support assembly through movement of the first support assembly.

2. The vehicle of claim 1 wherein the first and second support assemblies move in a direction generally parallel to the support surface between the spread and stowed positions.

3. The vehicle of claim 1 wherein the first and second support assemblies are each pivotally coupled to the base.

4. The vehicle of claim 3 wherein the first and second support assemblies are each pivotable about an upright axis between the spread and stowed positions.

5. The vehicle of claim 1 wherein the control mechanism includes an actuator that moves the support assemblies relative to each other.

6. The vehicle of claim 1 wherein the control mechanism includes a hydraulically operated actuator that moves the support assemblies relative to each other.

7. The vehicle of claim 1 wherein the control mechanism directly interconnects the first and second support assemblies.

8. The vehicle of claim 1 further comprising a second mechanical link interconnecting the first and second support assemblies and being configured to coordinate movement of the first and second support assemblies between the spread and stowed positions, and wherein the control mechanism is coupled to the first and second support assemblies via the second mechanical link.

9. The vehicle of claim 1 further comprising a fourth elongated support assembly movably coupled to the base, and a second mechanical link interconnecting the second and fourth support assemblies independently of the control mechanism and being configured to coordinate movement of the second and fourth support assemblies, and wherein the control mechanism is configured to control movement of the fourth support assembly through movement of the second support assembly.

10. The vehicle of claim 9 wherein the first, second, third and fourth support assemblies are each pivotally coupled to the base, the third and fourth support assemblies are movable relative to each other between spread and stowed positions, and the control mechanism is configured to control movement of the third and fourth support assemblies between the spread and stowed positions.

11. The vehicle of claim 1 further comprising a first wheel assembly coupled to the first support assembly, a second wheel assembly coupled to the second support assembly, a first steering mechanism coupled to the first wheel assembly and the first support assembly, and a second steering mechanism coupled to the second wheel assembly and the second support assembly, wherein the first and second steering mechanisms are configured to independently position the corresponding first and second wheel assemblies relative to the first and second support assemblies.

12. The vehicle of claim 11 further comprising a control system operatively coupled to the first and second steering mechanisms and being configured to, in response to operator input, command selected angular positions of the first and second wheel assemblies relative to the base by compensating for the first and second support assemblies being in the spread or stowed position.

13. The vehicle of claim 1 wherein the first mechanical link is connected to the first and third support assemblies independently of the control mechanism.

14. The vehicle of claim 1 wherein the first mechanical link is connected directly to the first and third support assemblies.

15. A vehicle comprising:
a base;
first and second elongated support assemblies pivotally coupled to the base and movable relative to the base and relative to each other between spread and stowed positions, the first and second support assemblies each being configured to engage a portion of a support surface in the spread and stowed positions such that the first and second support assemblies support at least a portion of the base above the support surface;
a control mechanism mechanically interconnected with the first and second support assemblies, the control mechanism being configured to control pivotal movement of the first and the second support assemblies between the spread and stowed positions;
third and fourth elongated support assemblies pivotally coupled to the base and movable relative to the base and relative to each other between spread and stowed positions, the third and fourth support assemblies each being configured to engage a portion of a support surface such that the third and fourth support assemblies support at least a portion of the base above the support surface;
a first mechanical link interconnecting the first and third support assemblies independently of the control mechanism and being configured to coordinate movement of the first and third support assemblies between the spread and stowed positions; and
a second mechanical link interconnecting the second and fourth support assemblies independently of the control mechanism and being configured to coordinate movement of the second and fourth support assemblies between the spread and stowed positions;
wherein the control mechanism is configured to control movement of the third and fourth support assemblies between the spread and stowed positions.

* * * * *